May 13, 1947.  M. MALLORY  2,420,436
TEMPERATURE CONTROL FOR INTERNAL COMBUSTION ENGINES
Filed Feb. 6, 1946
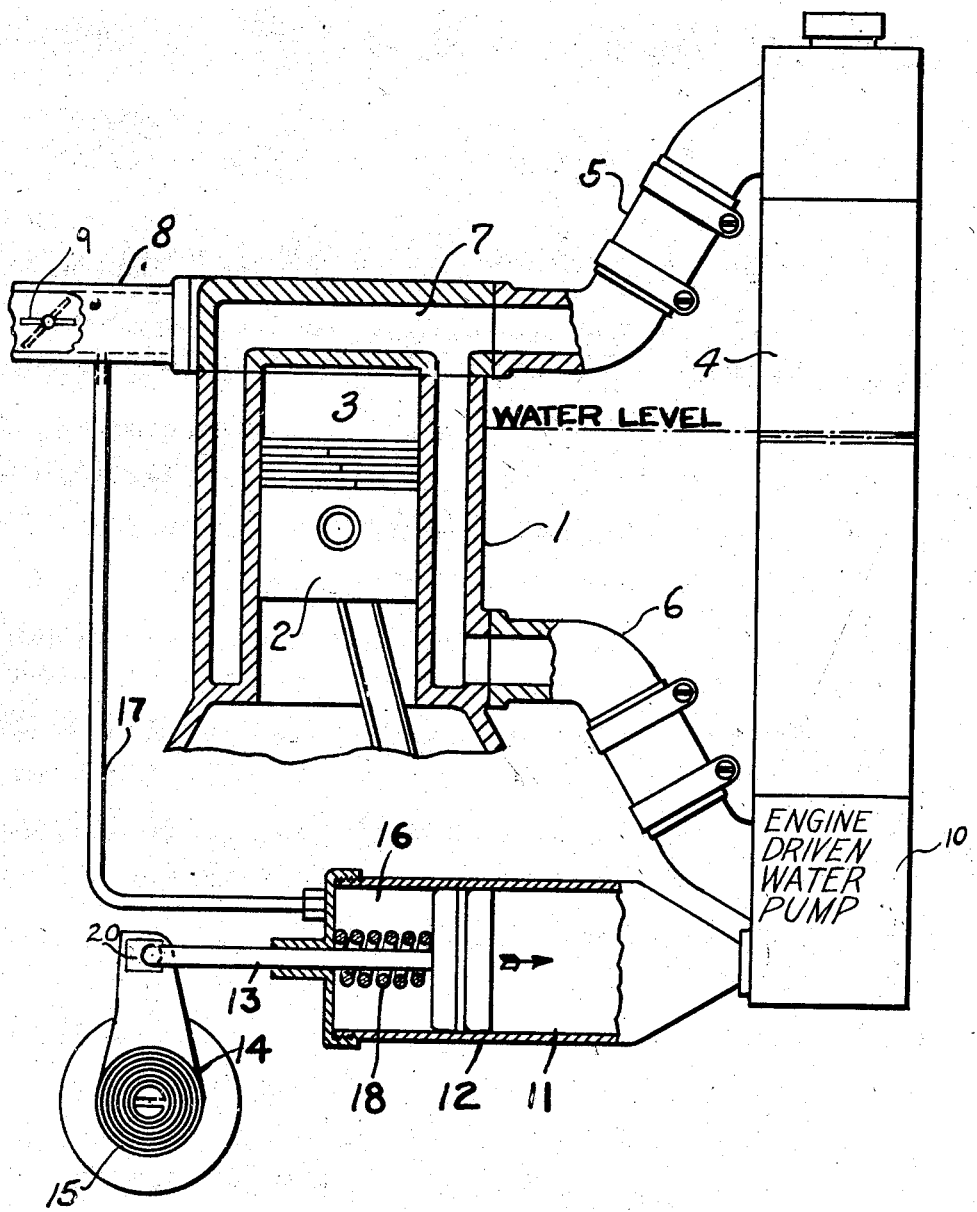
MARION MALLORY
INVENTOR
BY
ATTORNEYS.

Patented May 13, 1947

2,420,436

UNITED STATES PATENT OFFICE 2,420,436

TEMPERATURE CONTROL FOR INTERNAL-COMBUSTION ENGINES

Marion Mallory, Detroit, Mich.

Application February 6, 1946, Serial No. 645,834

11 Claims. (Cl. 123—178)

This invention relates to means for controlling the temperatures in the combustion chamber of an internal combustion engine and particularly for varying the temperatures under the varying load conditions of the engine so that, when the engine is operating under light load, the combustion chamber temperature will be much higher than the temperature is in the present day engines.

When an internal combustion engine is operating at wide open throttle and a full charge is drawn into the cylinders, the compression in the combustion chamber will run considerably higher than when the engine is operating at partly open throttle or light load. Consequently, the engine is much less efficient, that is, it delivers much less horse-power per pound of fuel consumed when operating under light load (that is, low compression) than when operating under full load (that is, high compression).

The compression under which an engine can be operated without spark knock or detonation is always determined from full load or wide open throttle operation. For example, the engine might operate with compression pressures of 225 pounds at wide open throttle without detonation but, when the throttle was closed or partly closed, the compression would be much lower. The ideal condition would be to operate on as high a compression as possible at part throttle, as well as wide open throttle, then the greatest economy would be had.

It is an object of this invention to control the heat in the upper part of the cylinder or combustion chamber so the explosions will have the effect of a high compression engine when the engine is operating under part throttle. This object is accomplished by controlling the temperature of the charge in the combustion chamber so that the charge will be compressed at higher temperature at part throttle and a lower temperature at wide open throttle. By compressing the charge at a higher temperature at part throttle than at wide open throttle, a greater and more rapid expansion of the charge in the combustion chamber is obtained which produces the effect of higher compression of the charge at part throttle. In particular, I control the temperature of the combustion chamber by controlling the cooling effect of the liquid coolant in the cooling system so that the cooling effect will be less at part throttle than at wide open throttle.

My invention contemplates controlling the temperature of the coolant in the cylinder head by varying the amount of water in circulation from that normally used by thermostatically controlled means, intake pressure control means or both working in combination.

In the figure I have shown a fragmentary cross section of an internal combustion engine showing my novel coolant control means for an internal combustion engine.

The elements constituting my invention are referenced as follows: internal combustion engine 1, reciprocating piston 2, combustion chamber 3, radiator 4 connected by hose lines 5 and 6 with the water jacket 7 of the cylinder head, intake passageway 8 on the engine side of the carburetor throttle 9, engine driven water pump 10, cylinder or water reservoir 11 connected into the lower end of the radiator 4, piston 12 in cylinder 11, rod 13 connecting piston 2 with arm 14 of a conventional thermostat having a helical coil 15 of thermostatic bimetal, chamber 16 which is connected by conduit 17 into the intake passageway 8 on the engine side of the throttle valve. Piston 12 seals off chamber 16 from the portion of cylinder 11 which acts as a water reservoir, compression springs 18 normally urging piston 2 in the direction of the arrow.

Thermostat 14 can be positioned in any conventional location so that it is in heat exchange relation with the engine and responds to variations in the temperature of the combustion chamber. Thus, thermostat 14 can be positioned upon and in heat exchange relation with the outside wall of cylinder 1 or can be positioned in water line 6 or closely adjacent to cylinder 1 so that it is effected by radiant heat therefrom. Bimetal coil 15 of the thermostat rotates arm 14 clockwise as the temperature rises and counter-clockwise as the temperature falls. Rod 13 has a bent end which engages arm 14 with a lost motion connection in opening 20. As shown in the drawings, the engine temperature has risen to, say, for example, 160° F., which is the highest temperature at which the engine will operate at wide open throttle without detonation. Thermostat arm 14 is in contact with the left hand end of rod 13 and throttle 9 is wide open.

Since the water jacket 7 is connected by hose 6 with the outlet or high pressure side of pump 10, jacket 7 will be substantially full of water at all times. The water level line in the radiator 4 at part open throttle is indicated in the drawing and carries the legend "Water level." At wide open throttle this level will be higher provided the engine temperature is at least 160° F. Assuming that one desires to keep the water in jacket 7, at say, for example, not less than 160° F., then as the temperature of the water in jacket 7 rises above 160° F., thermostat arm 14 will rotate clockwise and spring 18 will move piston 12 to the right to raise the water level in radiator 4 and increase the cooling effect on cylinder 3 and as the temperature of the water in jacket 7 tends to fall below 160° F., thermostat arm 14 will respond to this fall in engine temperature, rotate counterclockwise, and move piston 12 to the left thereby lowering the level of the water in radiator 4 and decreasing the cooling effect.

The operation of my device is as follows: Assuming that heat losses from the engine due to radiation and the circulation of the cooling water were such that the water temperatures in the cylinder block 7 would never reach over 160° when the throttle was wide open, then a higher compression could be used for wide open throttle without detonation. At wide open throttle the vacuum in manifold 8 on the engine side of the throttle valve will be low. Consequently piston 12 will be moved to the right by spring 18 which will raise the water level so as to preferably substantially fill all the space in water jacket 7 and radiator 4. As the throttle is moved toward closed position so that the engine is operating under part throttle or light load, the pressure will fall in chamber 16 due to the rise in vacuum in manifold 8 which will cause piston 12 to move in manifold toward the left and thereby lower the water level in radiator 4. The fall of the water level in radiator 4 will decrease the cooling effect and amount of water being circulated and consequently the temperature will rise in combustion chamber 3 giving the effect of a higher compression at part throttle. The exact level of the water in radiator 4 is not critical The important thing is that at part throttle the amount of water in circulation is decreased so as to raise the combustion chamber temperature and at wide open throttle the amount of water in circulation is increased so as to increase the cooling effect of the coolant and decrease the combustion chamber temperature. When the engine is cold, thermostat arm 14 will be in a position counterclockwise from that shown in Fig. 1, and the power exercised by bimetal coil 15 will be greater than the power of coil spring 18 so that piston 12 will be in a position to the left of that shown in the drawing. After the engine gets warm, then thermostat 14 will not affect the position of piston 12, which will be under the control of the intake passageway suction and spring 18, unless the engine becomes unduly overheated as described below. Thermostat 14 affects the position of piston 12 when the engine is operating cold and the water is below some given temperature such as, for example, 160° F. and also in case of overheating of the engine.

In the event the engine heat would become excessive or to a point that would affect operation, the thermostat 14 which is controlled by engine heat will act through the left side of opening 20 and rod 13 to oppose the vacuum control means and prevent piston 12 from moving too far to the left and subtracting too much water out of the circulating system or bringing the water level too low so as to reach such excessively high temperature.

I do not wish to be limited to using the thermostat and vacuum control means in combination. They can be used independent of each other. In other words, the vacuum control means can be used and the thermostat control means be eliminated or the thermostat control means be used and the vacuum control means be omitted. However, better control is had when they are working in combination because, when the engine is cold, the thermostat is in a position to reduce the water in the circulating system to its lowest point, causing the engine to warm up rapidly, but if the water was too low for normal operation, which would cause excessive heat, the thermostat would oppose the vacuum means and raise the water level or place more water in the circulating system. Of course, it will be understood that, when the throttle is wide open, the circulating system, that is the engine block and radiator, will be full of water, which keeps the engine cooler and makes possible higher compression without detonation.

Cylinder or reservoir 11 acts as a radiator to radiate heat from the body of water contained therein. Hence, when throttle 9 is opened to raise the pressure in chamber 16, this cool body of water in reservoir 11 is ejected from reservoir 11 into the engine water cooling system and brings the temperature down to thermostat temperature for wide open throttle.

I claim:

1. In an internal combustion engine comprising a combustion chamber, an intake passageway, a throttle valve controlling the flow of motive fluid through said intake passageway, a body of coolant liquid in heat exchange relation with said combustion chamber, a radiator through which said coolant flows for cooling the same, means actuated by changes in pressure in the intake passageway on the engine side of said throttle valve for changing the level of the liquid coolant body in said radiator, said means lowering said level in response to a drop in said intake passageway pressure and raising said level in response to a rise in intake passageway pressure.

2. In an internal combustion engine having an intake passageway, a throttle valve controlling the flow of motive fluid through said intake passageway, a combustion chamber, a coolant chamber in heat exchange relation with said combustion chamber, a radiator, a body of liquid coolant in said coolant chamber and radiator, means actuated by changes in intake passageway pressure on the engine side of said throttle valve for withdrawing and adding coolant to the coolant body in said coolant chamber and radiator, said means withdrawing liquid from said body of coolant in response to a fall in pressure in the intake passageway on the engine side of said throttle valve and adding liquid to said body of coolant in response to an increase in the pressure in said intake passageway on the engine side of said throttle valve.

3. In an internal combustion engine having an intake passageway, a throttle valve controlling the flow of motive fluid through said passageway, a combustion chamber, a coolant jacket in heat exchange relation with said combustion chamber, a variable capacity reservoir for coolant in communication with said jacket, a body of coolant in said jacket and reservoir, and means actuated by changes in intake passageway pressure on the engine side of said throttle valve for increasing the capacity of said reservoir as the intake passageway pressure drops and thereby increasing the proportion of coolant in said reservoir and for decreasing the capacity of said reservoir as the intake passageway pressure rises to decrease the proportion of coolant in said reservoir whereby the temperature of the combustion engine is maintained higher at part throttle than at wide open throttle.

4. In an internal combustion engine having a combustion chamber, a body of coolant in heat exchange relation with said combustion chamber, and temperature responsive means in heat exchange relation with said combustion chamber for increasing the effective heat exchange between said body of liquid coolant and combustion chamber as the temperature of the combustion chamber tends to rise above a given temperature and for decreasing said effective heat exchange as the temperature of the combustion chamber tends to fall below a given temperature.

5. In an internal combustion engine having an intake passageway, a throttle valve controlling the flow of motive fluid through said passageway, a combustion chamber, a coolant jacket in heat exchange relation with said combustion chamber, a variable capacity reservoir for coolant in communication with said jacket, a radiator in communication with said reservoir and jacket, a body of coolant in said jacket and reservoir and radiator, means for circulating the coolant through said radiator and jacket, and means actuated by changes in intake passageway pressure on the engine side of said throttle valve for increasing the capacity of said reservoir as the intake passageway pressure drops and thereby increasing the proportion of coolant in said reservoir and for decreasing the capacity of said reservoir as the intake passageway pressure rises to decrease the proportion of coolant in said reservoir whereby the body of coolant circulated through said radiator and jacket is smaller at part throttle and greater at wide open throttle and the temperature of the combustion engine is maintained higher at part throttle than at wide open throttle.

6. In an internal combustion engine having a combustion chamber, a body of coolant in heat exchange relation with said combustion chamber, a radiator through which said body of coolant is circulated for cooling the same, and temperature responsive means in heat exchange relation with said combustion chamber for increasing the size of said body of coolant being circulated through said radiator as the temperature of the combustion chamber tends to rise above a given temperature and for decreasing the size of said body of coolant circulating through said radiator as the temperature of the combustion chamber tends to fall below a given temperature.

7. In an internal combustion engine having an intake passageway, a throttle valve controlling the flow of motive fluid through said passageway, and a liquid coolant system for said engine, the combination comprising means actuated by changes of pressure in the intake passageway on the engine side of said throttle valve for controlling the operation of said coolant system, said means responding to a fall in pressure in said intake passageway to decrease the cooling effect of said cooling system and responding to a rise in pressure in said intake passageway to increase the cooling effect of said coolant system, and temperature responsive means in heat exchange relation with said engine operatively connected to said pressure actuated means for rendering the pressure actuated means ineffective to further decrease the cooling effect of said coolant system whenever the temperature of the coolant is above a given temperature.

8. The combination as set forth in claim 5 including temperature responsive means in heat exchange relation with said engine and operatively connected to said pressure actuated means for rendering the pressure actuated means ineffective to further decrease the capacity of the said reservoir whenever the temperature of the coolant is above a given tempeature.

9. The combination as set forth in claim 5 including temperature responsive means in heat exchange relation with said engine and operatively connected to said pressure actuated means for rendering the pressure actuated means ineffective to further increase the capacity of the said reservoir whenever the temperature of the coolant is below a given temperature.

10. The combination as set forth in claim 3 including temperature responsive means in heat exchange relation with said engine and operatively connected to said pressure actuated means for rendering the pressure actuated means ineffective to further decrease the capacity of the said reservoir whenever the temperature of the coolant is above a given temperature.

11. In an internal combustion engine having an intake passageway, a throttle valve controlling the flow of motive fluid through said passageway, a combustion chamber, a coolant jacket in heat exchange relation with said combustion chamber, a variable capacity reservoir for coolant in communication with said jacket, said reservoir being in the form of a cylinder and piston, a radiator in communication with said reservoir and jacket, a body of coolant in said jacket and reservoir and radiator, means for circulating the coolant through said radiator and jacket, and means actuated by changes in intake passageway pressure on the engine side of said throttle valve and operatively connected with said piston for moving the same to increase the capacity of said reservoir as the intake passageway pressure drops and thereby increasing the proportion of coolant in said reservoir and to move said piston in the opposite direction to decrease the capacity of said reservoir as the intake passageway pressure rises to decrease the proportion of coolant in said reservoir whereby the body of coolant circulated through said radiator and jacket is smaller at part throttle and greater at wide open throttle and the temperature of the combustion engine is maintained higher at part throttle than at wide open throttle.

MARION MALLORY.

REFERENCES CITED

The following references are of record in the file of this patent:

UNITED STATES PATENTS

| Number | Name | Date |
| --- | --- | --- |
| 1,267,783 | Macauley | May 28, 1918 |
| 1,785,207 | Page | Dec. 16, 1930 |
| 2,134,662 | Flamm | Oct. 25, 1938 |
| 1,728,176 | Dowell | Sept. 17, 1939 |
| 1,253,695 | La Porte | Jan. 15, 1918 |